(12) United States Patent
Fernandez et al.

(10) Patent No.: US 11,736,334 B2
(45) Date of Patent: Aug. 22, 2023

(54) SETTING BASEBAND GAIN FOR SIGNALS BELOW NOISE

(71) Applicant: SR Technologies, Inc., Sunrise, FL (US)

(72) Inventors: Olivia Fernandez, Pompano Beach, FL (US); Ryan Busser, Fort Lauderdale, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 17/702,040

(22) Filed: Mar. 23, 2022

(65) Prior Publication Data

US 2022/0337469 A1  Oct. 20, 2022

Related U.S. Application Data

(60) Provisional application No. 63/175,319, filed on Apr. 15, 2021.

(51) Int. Cl.
| | |
|---|---|
| *H04L 27/36* | (2006.01) |
| *H04L 5/00* | (2006.01) |
| *H04B 1/00* | (2006.01) |
| *H04B 1/40* | (2015.01) |

(52) U.S. Cl.
CPC ........ *H04L 27/364* (2013.01); *H04B 1/0032* (2013.01); *H04B 1/40* (2013.01); *H04L 5/0007* (2013.01)

(58) Field of Classification Search
CPC ... H04L 27/364; H04L 5/0007; H04B 1/0032; H04B 1/40
See application file for complete search history.

(56) References Cited

U.S. PATENT DOCUMENTS

| | | | | |
|---|---|---|---|---|
| 2003/0181179 | A1* | 9/2003 | Darabi | H03G 3/3052 |
| | | | | 455/253.2 |
| 2011/0150038 | A1* | 6/2011 | Korol | H03F 1/3211 |
| | | | | 375/285 |

* cited by examiner

*Primary Examiner* — Sung S Ahn
(74) *Attorney, Agent, or Firm* — Christopher & Weisberg, P.A.

(57) ABSTRACT

Methods and devices are disclosed that derive an IQ magnitude parameter, and then determine the optimum IQ magnitude for wanted signals with negative signal to noise values. For each device installation, a calibration routine may be carried out that sets the baseband gain to produce this optimum IQ magnitude for each frequency channel.

14 Claims, 14 Drawing Sheets

SETTING BASEBAND GAIN FOR SIGNALS BELOW NOISE

CROSS-REFERENCE TO RELATED APPLICATION

This application is related to and claims priority to U.S. Provisional Patent Application No. 63/175,319, filed Apr. 15, 2021, entitled SETTING BASEBAND GAIN FOR SIGNALS BELOW NOISE, the entirety of which is incorporated herein by reference.

TECHNICAL FIELD

The present disclosure relates to the setting of baseband gain control used for the geo-location of wireless devices, and in particular to a method and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and may be referred to as the "Standard" herein.

Location of wireless devices can be determined by various methods. These methods may be classified as active, passive and combined active and passive. In an active location scheme, a device that is determining the location or range, the measuring device, transmits certain packets, referred to as "ranging packets", to a device being located, i.e., the target device. A common method is to measure the time of arrival (TOA) of a response packet from the target device, and compare that to the time of departure (TOD) of the ranging packet that was transmitted by the measuring device so as to determine the round trip time, RTT.

In such location systems it is common to use multiple measuring devices to determine the location. In such systems, simultaneous TOA and/or TOD measurements are taken by different measuring devices situated at different points, and the location of the target device is calculated from these simultaneous measurements.

In an active location system, the TOD may be measured for a ranging packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the ranging packet transmitted from the measuring station to the target station is a data packet, the response from the target station will typically be an acknowledgement (ACK) packet. If the ranging packet transmitted from the measuring station to the target station is a control packet, for example a request-to-send (RTS) packet, then the response from the target station will typically be a clear-to-send (CTS) packet. In these two examples, the turnaround time at the target station is defined in the IEEE 802.11 standard as the short interframe spacing (SIFS), which is a preset value. Hence, the time delay, td, or time of flight (TOF) between the measuring station and the target station may be determined from the calculation td=(TOA−TOD−SIFS)/2. The distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b and 110c (referred to collectively herein as "measuring stations" or "measuring receivers" 110). The target station 120 may be a wireless device, such as, for example, an Access Point (AP) that is to be located by the three measuring stations 110. The distance of the target station 120 from measuring station 110a is D1, 130. The distance of the target station 120 from measuring station 110b is D2, 140. The distance of the target station 120 from measuring station 110c is D3, 150. The time of flight, TOF1, determined from the calculation TOF=(TOA−TOD−SIFS)/2, is measured for transmissions from measuring station 110a and this can be used to calculate the distance D1 130 using the formula D1=TOF1*c where c is the speed of light. Similarly, TOF2 and TOF3 measurements result in the determination of distances D2 140 and D3 150. The methods for calculating the location of target station 120 using the distances D1 130, D2 140 and D3 150 are known.

FIG. 2 is a diagram of a location system where a single airborne measuring station 110 is used. The airborne measuring station 110 is depicted being flown in a circular orbit 200, center E 220, around a target station 120 at location F 230. The distance of the target station 120 from the measuring station 110, when the measuring station 110 is at position A 201, is D4 210. The distance of the target station 120 from the measuring station 110, when the measuring station 110 is at position B 202, is D5 211. The distance of the target station 120 from the measuring station 110, when the measuring station 110 is at position C 203, is D6 212. Unless the target station 120 is positioned at the center E 220 of the orbit 200, the distances D4 210, D5 211, and D6 212 will not be equal and thus, in the general sense, as the airborne measuring station 110 moves around the orbit 200 the RTT measurements will vary in relation to the relative positions of the airborne measuring station 110 and the target station 120.

The signal level, Pr, received at the airborne measuring station 110 is:

$$Pr = Pt + G_1 + G_2 - L_{fs} - Lo \qquad (1)$$

where: Pt=Transmit power from the target station 120;
$G_1$=Antenna gain at the airborne measuring station;
$G_2$=Antenna gain at the target station;
$L_{fs}$=Propagation loss, free space; and
Lo=Obstruction loss.

With respect to an airborne measuring station 110, the obstruction losses, Lo, for target stations may vary from 0 dB, for line of sight or outdoor target stations, up to 15-20 dB for target stations that are indoors. The range of the airborne measuring station 110 to successfully detect the response packets from each of these target stations is dependent upon the receive sensitivity of the airborne measuring station 110. A standard airborne measuring station, compliant with the Standard, would need to receive a packet without errors and the receive sensitivity is restricted by the noise figure.

Methods to improve the sensitivity of the airborne measuring station 110 include that of a technique known as correlation where the individual bits of the received response packet are compared to the individual bits of the expected response packet and a decision may be taken as to whether the true response packet, CTS or ACK, has been received. Such correlation methods are known, and, by using the process of correlation, packets may be detected at signal levels well below the noise level, i.e., at negative signal to noise ratios, SNRs.

FIG. 3 is a timing diagram that describes a ranging method that may be used to determine the distance between two wireless devices, the airborne measuring station 110 and the target station 120. Time axis 310 refers to the time axis for airborne measuring station 110 and time axis 320 refers to the time axis for target station 120. At time T1 311, airborne measuring station 110 transmits a ranging packet 312 to the target station 120. This ranging packet 312 is received at the target station 120 at time T2 313. The propagation time of the transmission of the ranging packet 312 is (T2−T1) 330. The target station 120 transmits a response packet 324 at time T3 323. The time 322 that has elapsed between the reception of the ranging packet at time T2 313 and the transmission at time T3 323 is the turnaround time at the target station 120. Ideally, the turnaround time 322 at the target station 120 will be equal in duration to SIFS. At time T4 314, the airborne measuring station 110 receives the response packet 324 from the target station 120. The propagation time of the transmission of the response packet 324 is (T4−T3) 334. It should be noted that the time differences 330 (T2−T1) and 334 (T4−T3) represent the propagation time, td, of the transmissions and should be equal, assuming the distance between the two stations has not changed. The total time that elapses between the transmission of the ranging packet 312 and the response packet 324 at the airborne measuring station is:

$$(T2-T1)+(T3-T2)+(T4-T3)=(T4-T1)=td+\text{SIFS}+td \quad (1)$$

Hence, $td=(T4-T1-\text{SIFS})/2$ (2)

With reference again to FIG. 2, as the airborne measuring station 110 is moving around the orbit 200, it may be transmitting ranging packets 312. Response packets 324, from the intended target station 120, may be received.

The airborne measuring station 110, however, may also be receiving signals from other ground based stations, and, as they are at a higher signal level than the noise level, these unwanted signals may cause the automatic gain control of the receiver in the airborne measuring station 110 to reduce the overall baseband gain, and cause the wanted signal, which is below the noise level, to be compressed.

SUMMARY

Some embodiments relate to the setting of baseband gain control used for the geo-location of wireless devices such as wireless local area network (WLAN) devices. In accordance with one embodiment, a method in a first wireless device (WD) for setting a receiver baseband gain for receiving wanted signals with negative signal to noise by a receiver of the WD is provided. For each channel of the WD, a setting of a receive baseband gain of the receiver that produces an IQ magnitude parameter having a predetermined value is determined in which the predetermined value is predetermined as a value that results from an applied receive baseband gain setting that produces a predetermined receiver sensitivity For each channel of the WD, the determined receive baseband gain setting for subsequent application to signals received by the receiver is stored.

In accordance with another embodiment, a first wireless device (WD) is provided. The first wireless device includes a wireless transmitter, a wireless receiver and processing circuitry in communication with the wireless transmitter and the wireless receiver. The wireless transmitter is configured to transmit a ranging signal and the wireless receiver configured to receive a response signal from a second WD in response to the ranging signal. The processing circuitry is configured to, for each channel of the first WD: vary settings of a receive baseband gain of the wireless receiver and determine an IQ parameter value for each receive baseband gain setting, and record a receive baseband gain setting that produces a predetermined IQ parameter value for the channel, the predetermined IQ parameter value being predetermined based on a determined sensitivity of the wireless receiver resulting from each of a plurality of receive baseband gain settings.

In accordance with still another embodiment, a method for pre-calibrating a wireless receiver of a wireless device, WD, is provided. A plurality of response packets is inputted to a low noise amplifier (LNA) of the wireless receiver. For each of a plurality of baseband gain settings of the wireless receiver, an IQ parameter based at least in part on I and Q values generated by the wireless receiver in response to the response packets is determined and stored. A determined IQ parameter that produces at least a specified level of receiver sensitivity is selected.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
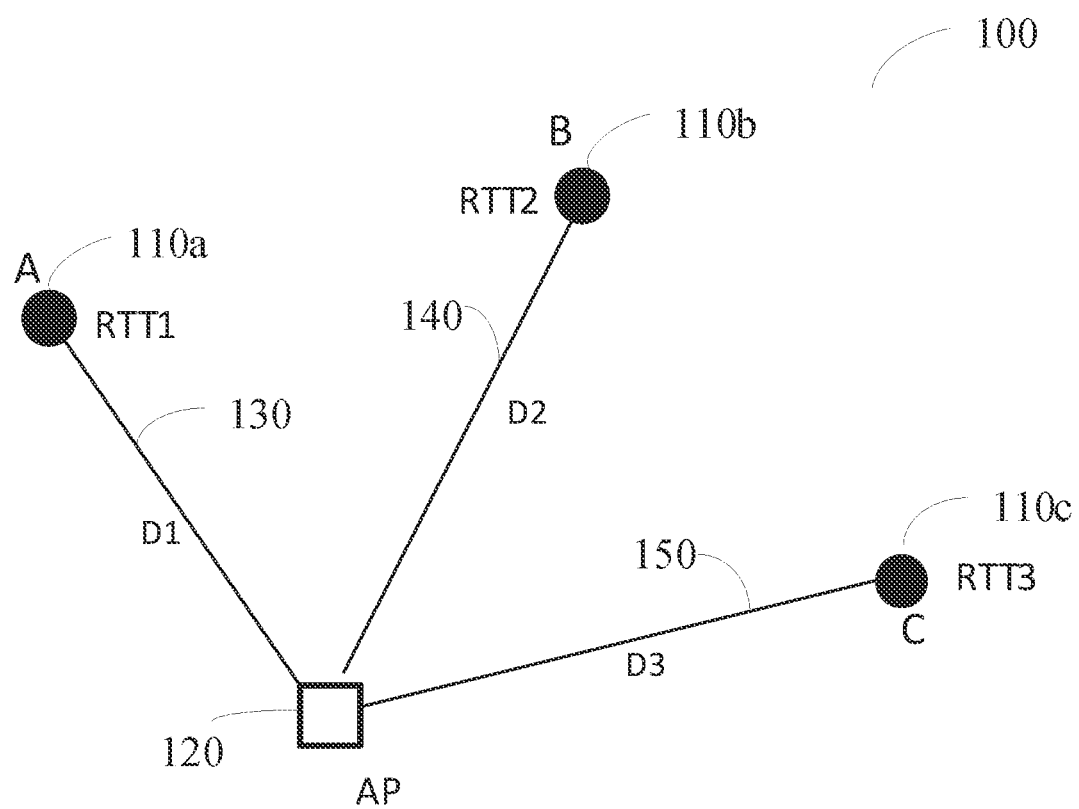
FIG. 1 is a diagram of a typical location system which includes three measuring stations.
Figure 2:
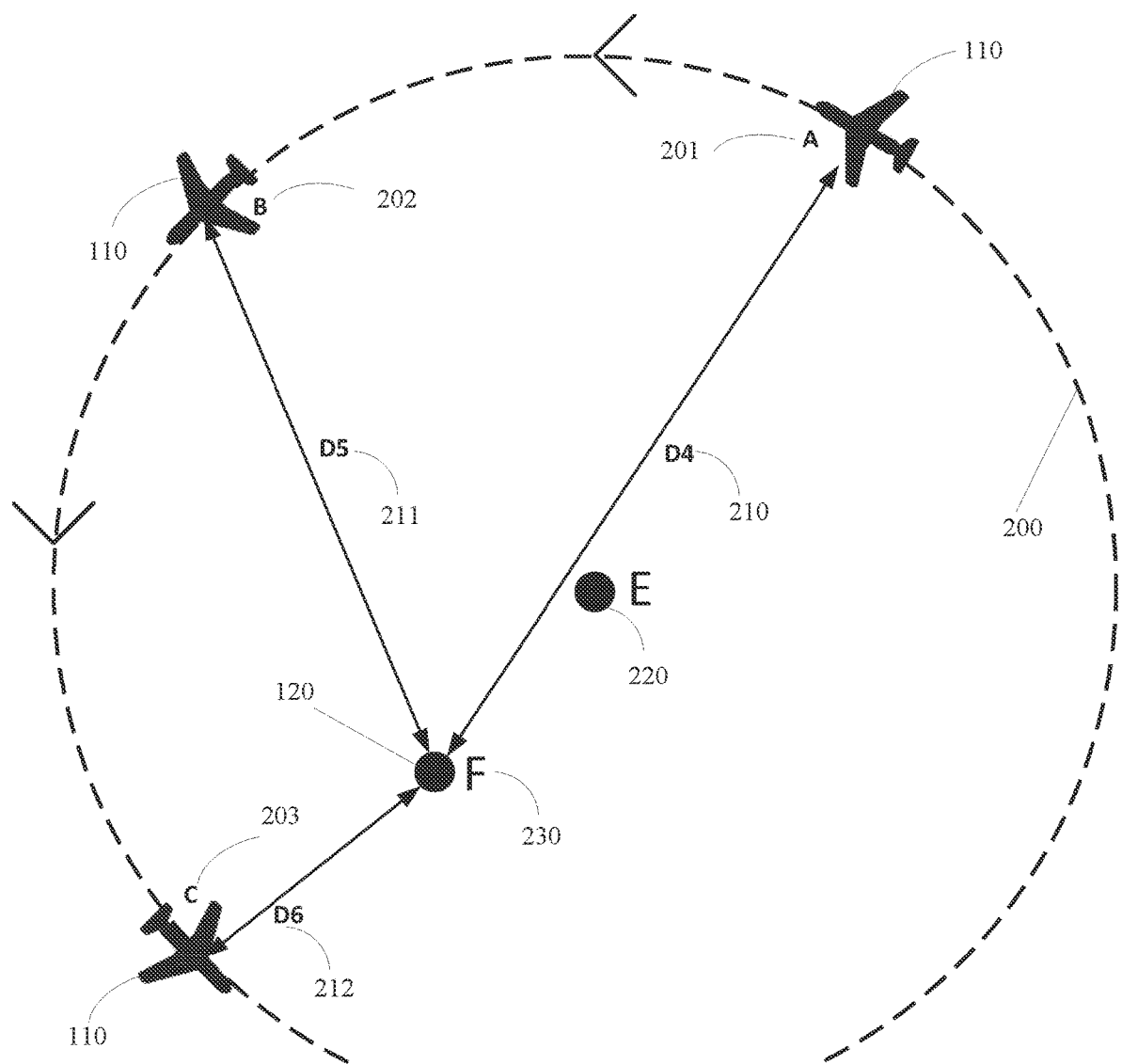
FIG. 2 is a diagram of a location system where a single airborne measuring station is used.

In one embodiment of the present disclosure, a single airborne measuring station 110 is used to transmit ranging packets 312 to a target station 120, and then detect the corresponding response packets 324 using correlation. A process is disclosed to calibrate the baseband gain of the airborne measuring station 110, for each channel. In some embodiments, the response packets 324 are direct sequence spread spectrum, DSSS, ACK and CTS packets in response to data null and RTS packets respectively, in the 2.4 GHz. In other embodiments, the response packets 324 are orthogonal frequency division multiplexing, OFDM, ACK and CTS packets in response to data null and RTS packets respectively, in the 2.4 and 5 GHz bands. The airborne measuring station 110 may correlate the received bit stream with the known bit stream of the expected wanted response packet 324, such that wanted packets may be detected at negative signal to noise ratios, SNRs.

The thermal noise signal level, Pn, may be calculated using the standard formula:

$$Pn = 10 \log(1000 \, K \, T) + 10 \log BW + NF \, dBm \quad (3)$$

where: K is Boltzmann's constant;
T is temperature in degrees Kelvin;
BW is the occupied bandwidth, Hz; and
NF is the noise figure, dB.
For T=200 Celsius, 10 log (1000 K T)=−174 dBm.
For BW=20 MHz and NF=3 dB, Pn=−98 dBm.

Figure 4:
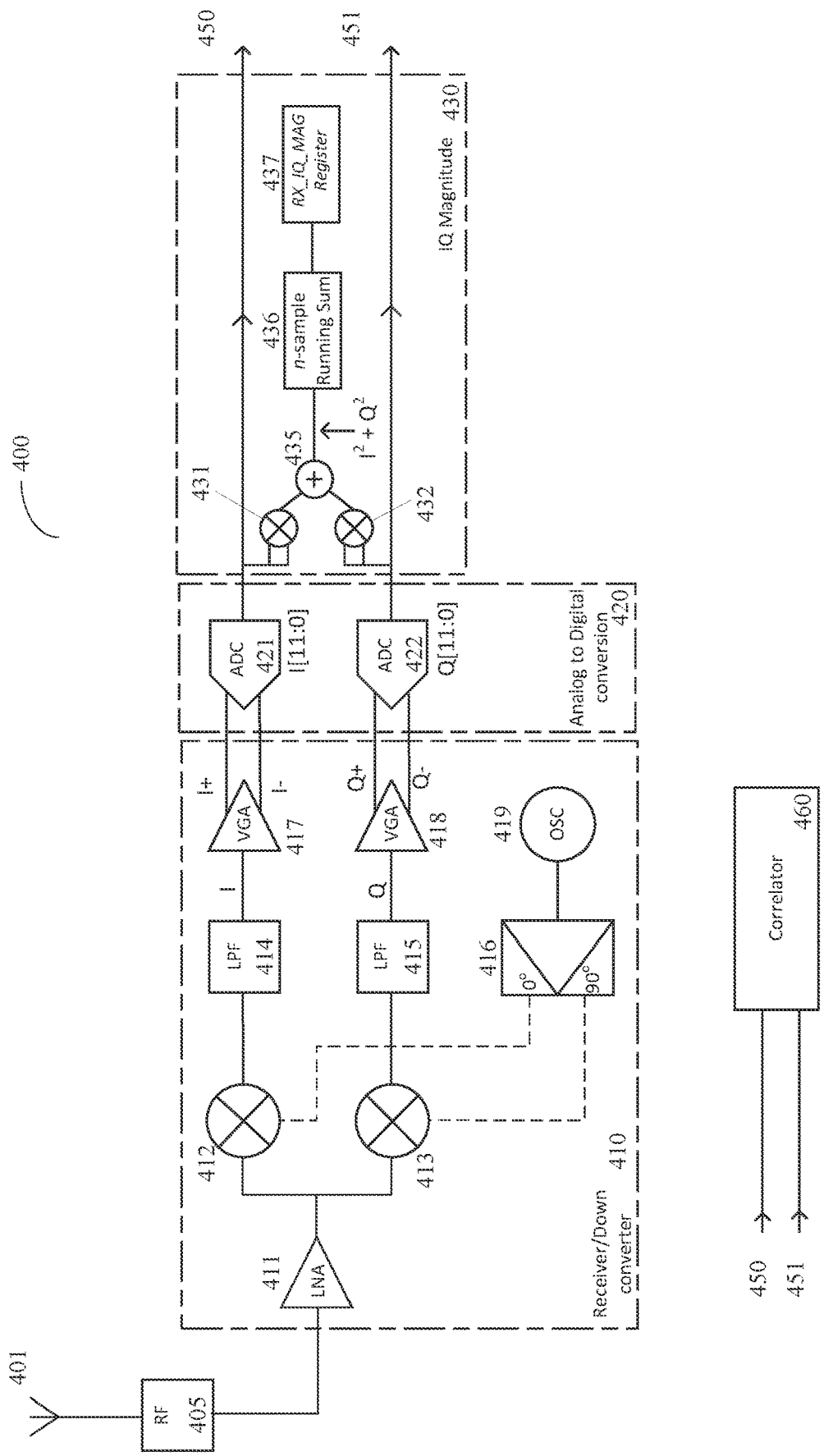
FIG. 4 is a schematic diagram of an example of a receiver front end of the receiver of the airborne measuring station.

Referring again to the drawing figures in which like reference designators refer to like elements, FIG. 4 is a schematic diagram of an example of a receiver front end 400 of the receiver of an airborne measuring station 110. The receiver front end 400 may include an antenna 401, radio frequency RF circuitry 405, a receiver/down converter 410, analog to digital converter 420, and IQ magnitude block 430. Signals received at the antenna 401 may be inputted to the receiver/down converter 410 via RF circuitry 405. The RF circuitry 405 may comprise a combination of one or more LNAs, RF splitter/combiners, directional couplers, antenna switches, diplexers, RF cabling and the like. The details of the RF circuitry may vary for different installations of the airborne measuring station 110 in various airframes. The signals inputted to the receiver/downconverter 410 are first amplified by a low noise amplifier (LNA) 411, and then inputted to two mixers 412 and 413. The output of an oscillator 419, at the channel frequency, is conditioned by phase shifter 416 into 0-degree and 90-degree phased outputs. The 0-degree frequency output is applied to mixer 412 and the 90-degree shifted output is applied to mixer 413. The baseband output from mixer 412, corresponding to the in phase, I, baseband signal, is selected by low pass filter LPF 414 and then inputted to variable gain amplifier, VGA 417. The baseband output from mixer 413, corresponding to the quadrature, Q, baseband signal, is selected by low pass filter LPF 415 and inputted to VGA 418. The output from VGA 417 is a balanced output, I+ and I−, which is inputted to analog to digital converter ADC 421. The output from VGA 418 is a balanced output, Q+ and Q−, which is inputted to ADC 422.

The digital output I from ADC 421 is squared, $I^2$, in block 431 and similarly, the digital output Q from ADC 422 is squared, $Q^2$, in block 432. The outputs of the squaring blocks 431 and 432 are then summed 435 to produce a value that is proportional to $I^2+Q^2$. As the outputs, I and Q of the ADCs 421 and 422 are derived from the signal voltage, then $I^2+Q^2$ represents the magnitude of the sum of the signals. A running sum over a number of $I^2+Q^2$ samples may be calculated in summing block 436 and the sum magnitude results may be stored in a register 437 as "RX_IQ_MAG".

Figure 3:
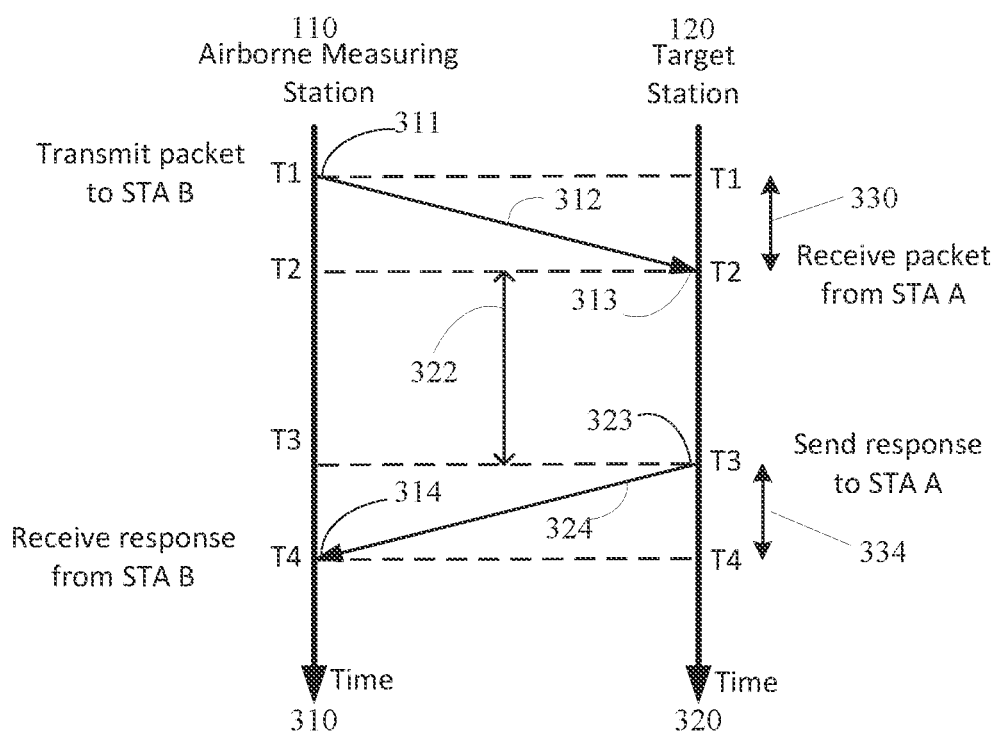
FIG. 3 is a timing diagram that describes a ranging method that may be used to determine the distance between two wireless devices, the airborne measuring station and the target station.

The I and Q outputs 450 and 451 of the ADCs 421 and 422 respectively may be inputted to a correlator 460 that correlates the received bit stream with the desired packet bit stream. The correlator 460 may detect the wanted response packets 324 and then determine the associated RTT values, as described above with respect to FIG. 3.

The baseband gains of the mixers 412 and 413, the LPFs 414 and 451 and the VGAs 417 and 418 may be controlled by the "BB_Gain" setting. For example, the baseband variable gain may be 62 dB, with a BB_Gain setting in 31 steps of 2 dB. With a fixed LNA 411 gain of, for example, 30 dB, the overall maximum gain of the receiver/down converter, 410, is therefore 92 dB. The BB_Gain is generally set in an automatic gain control, AGC, scheme, such that the signals presented to the ADCs 421 and 422, are not limited by the ADCs, either by being too high or too low. AGC for ADC signal levels is known and is beyond the scope of this disclosure.

For example, the ADCs 421 and 422 may have 12 bits with a maximum voltage of 3.3V and hence, with a range of $(2^{12}-1)=4095$, each bit represents 3.3/4095=0.000806V.

As discussed above with reference to equation (3), the thermal noise may be −98 dBm. Correlation of the wanted response packets 324, can detect DSSS and OFDM CTS and ACK packets as low as −125 dBm whereas standard detection of the wanted response packets 324 can be used for DSSS signal levels down to about −100 dBm and about −97 dBm for OFDM.

With reference to FIG. 4, in an airborne measuring station 110, a directional antenna 401 may be used such that the gain of the antenna and RF circuitry 405 plus the gain of LNA 411 may be in the order of 50 dB. Hence, with the example that the baseband gain variation is 62 dB, the possible variation in gain, is 50 to 112 dB.

The peak-to-peak voltage, Vpp, at the input of the ADCs 421 and 422, for a received signal of x dBm at the antenna 401, amplified Y dB by the fixed and baseband gain, is derived as follows:

$$x \, dBm = (x - 30) \, dBW$$

$$= \sqrt{50 \cdot 10^{(x-30)/10}} \, Vrms$$

After Y dB gain, the voltage, Vin, at the input to the ADCs 421 and 422:

$$Vin = \sqrt{50 \cdot 10^{((x-30)+Y)/10}} \, V \text{ rms}$$

Then, the peak-to-peak voltage, Vpp at the input to the ADCs 421 and 422, is:

$$Vpp = 2\sqrt{2} \, Vin \quad (4)$$
$$= 2\sqrt{100 \cdot 10^{((x-30)+Y)/10}} \, V$$

The output, I and Q, of each ADC 421 and 422:

$$I = Q = Vpp \cdot 4095/3.3$$

And, assuming no gain due the summing 436 over a number of samples, $$RX\_IQ\_MAG = I^2 + Q^2 = 2(Vpp \cdot 4095/3.3)^2 \quad (5)$$

Figure 5:
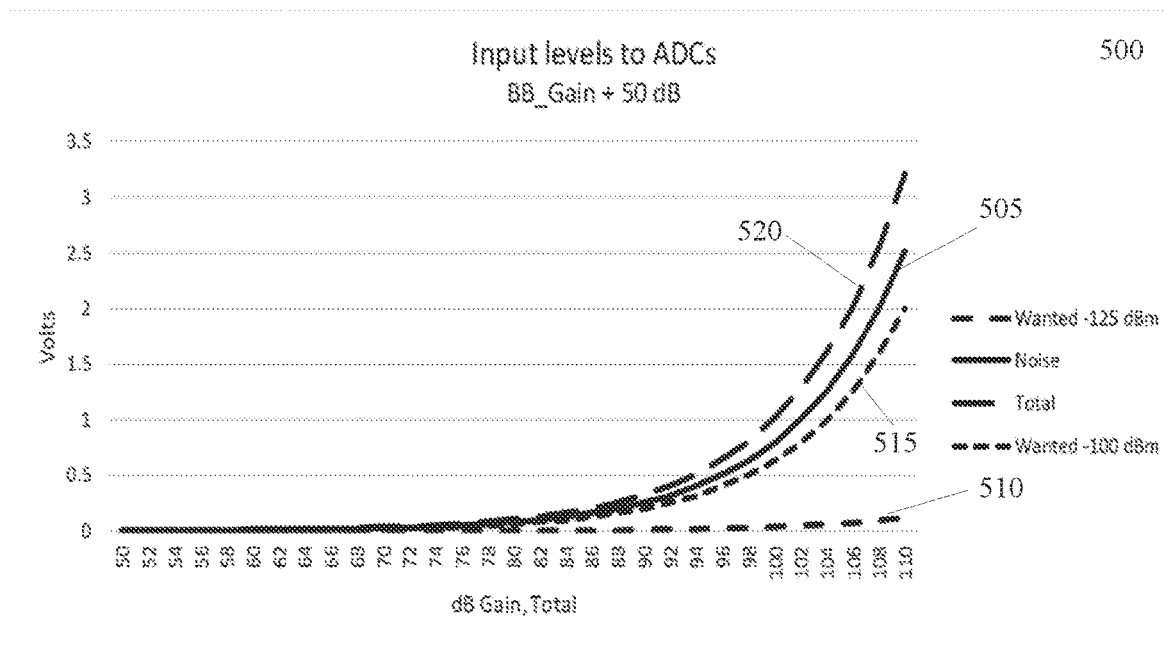
FIG. 5 is a graphical representation of the noise and signal levels at the input to the ADCs for BB_Gain from 0 to 62 dB and a fixed gain of 50 dB.

FIG. 5 is a graphical representation 500 of the noise and signal levels at the input to the ADCs 421 and 422 for baseband gain from 0 to 62 dB and a fixed gain of 50 dB. Plot 505 is the noise, plot 510 is for a received signal strength of −125 dBm, and plot 515 is for a received signal strength of −100 dBm. Plot 520 is for the combined noise and −100 dBm wanted signal. At the maximum gain, 112 dB, plot 510, the highest total signal, approaches the maximum input for the ADCs, 3.3 V.

Figure 6:
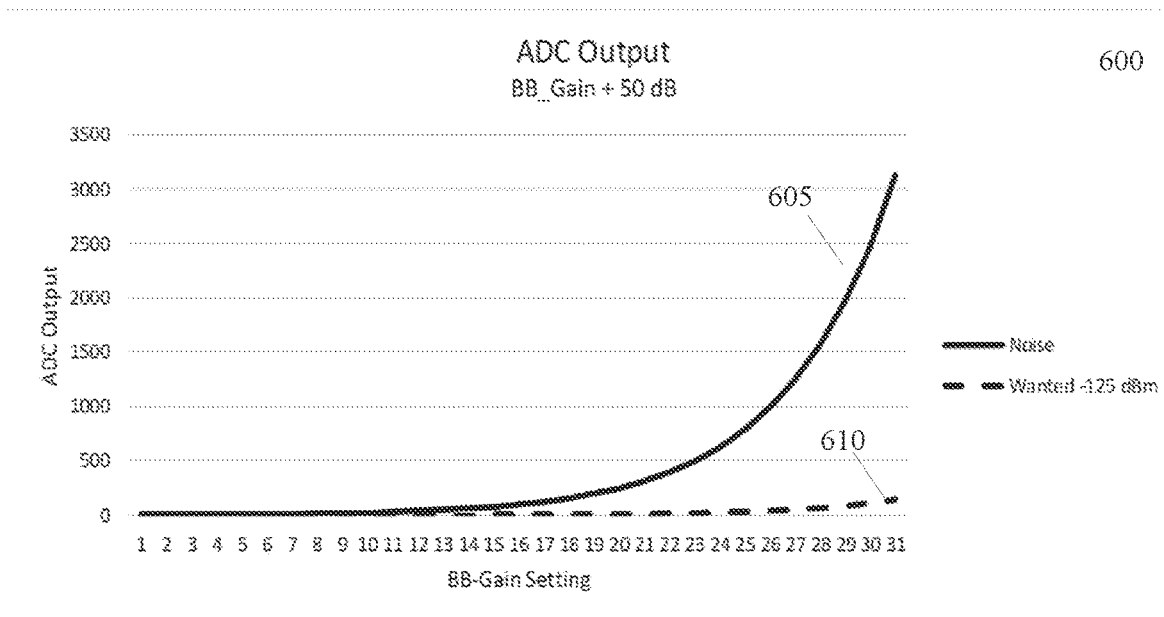
FIG. 6 is a graphical representation of the output of the ADCs for BB_Gain settings of 0 to 31, a variation of BB_Gain of 0 to 62 dB, and a fixed gain of 50 dB.

FIG. 6 is a graphical representation 600 of the output of the ADCs 421 and 422 (from FIG. 4) for BB_Gain settings of 0 to 31, a variation of baseband gain of 0 to 62 dB, and a fixed gain of 50 dB. Plot 605 is for the noise and plot 610 is for a wanted signal of −125 dBm.

Figure 7:
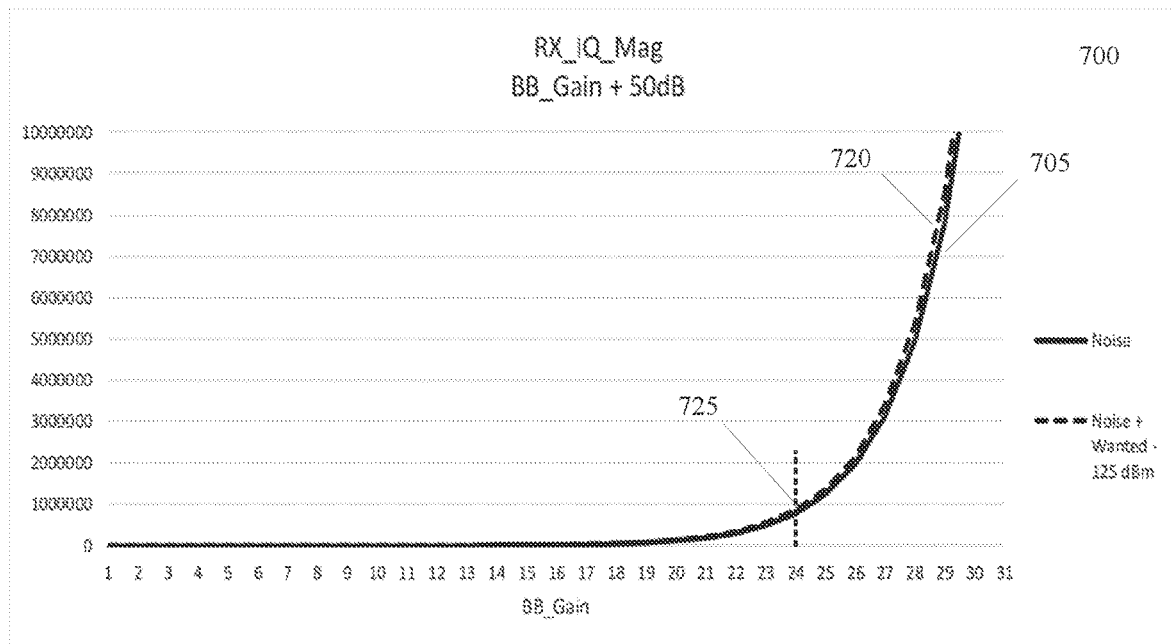
FIG. 7 is a graphical representation of the RX_IQ_MAG for variation in BB_Gain setting from 0 to 31 with a 50 dB fixed gain.

FIG. 7 is a graphical representation 700 of the RX_IQ_MAG 437 (from FIG. 4) for variation in BB_Gain setting from 0 to 31 with a 50 dB fixed gain. Plot 705 is the noise, and plot 720 is the noise plus a −125 dBm wanted signal. At a setting of BB_Gain of 24, 725, the RX_IQ_MAG value is in the order of 1000000.

Figure 8:
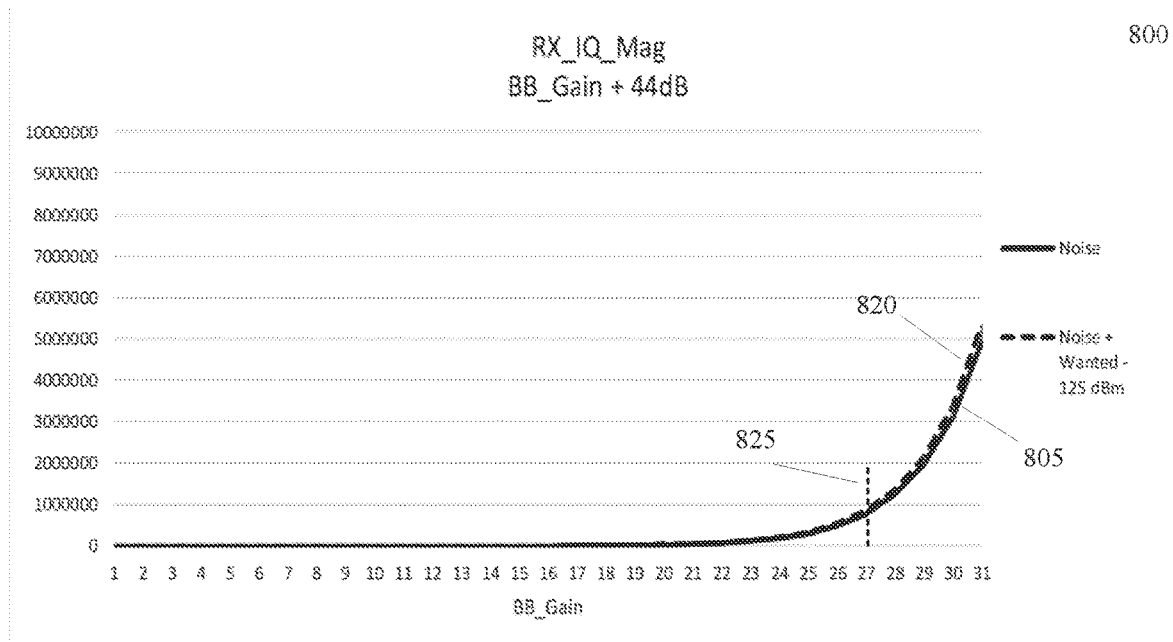
FIG. 8 is a graphical representation of the RX_IQ_MAG for variation in BB_Gain setting from 0 to 31 with a 44 dB fixed gain.

FIG. 8 is a graphical representation 800 of the RX_IQ_MAG 437 (from FIG. 4) for variation in BB_Gain setting from 0 to 31 with a 44 dB fixed gain. Plot 805 is the noise, and plot 820 is the noise plus a −125 dBm wanted signal. For RX_IQ_MAG=1000000, a BB_Gain setting of 27 is required, 825.

Figure 9:
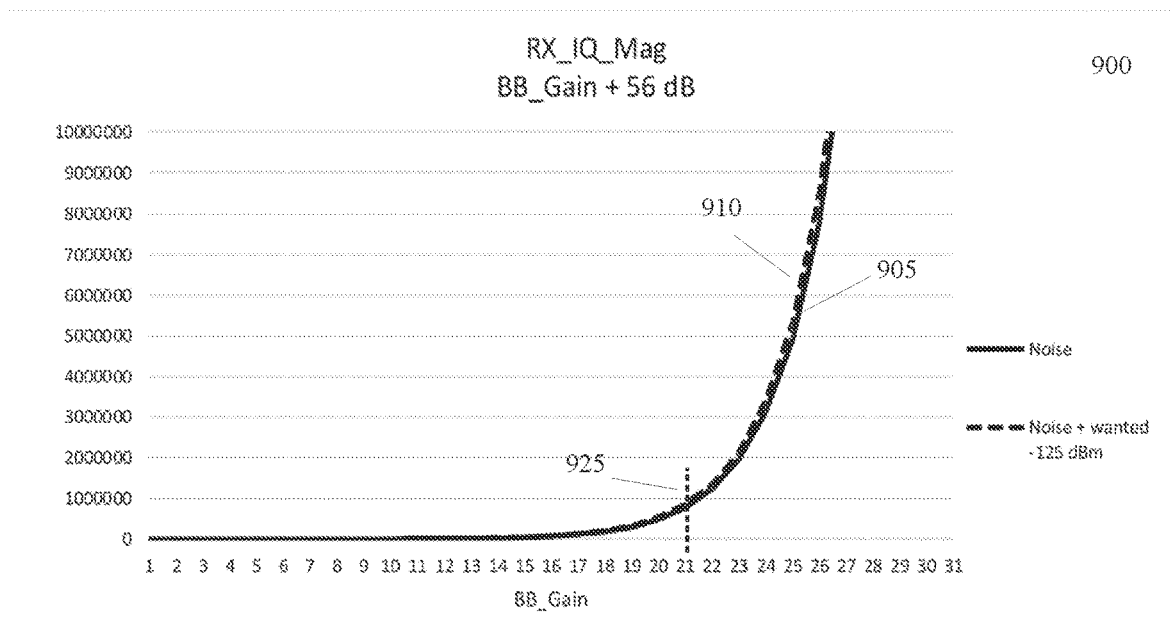
FIG. 9 is a graphical representation of the RX_IQ_MAG 437 for variation in BB_Gain setting from 0 to 31 with a 56 dB fixed gain.

FIG. 9 is a graphical representation 900 of the RX_IQ_MAG 437 (from FIG. 4) for variation in BB_Gain setting from 0 to 31 with a 56 dB fixed gain. Plot 905 is the noise, and plot 910 is the noise plus a −125 dBm wanted signal. For RX_IQ_MAG=1000000, a BB_Gain setting of 21 is required, 925.

With reference again to FIG. 4, in the general sense, the fixed gain due to the gains of antenna 401, the RF circuitry 405 and the LNA 411 will vary with different installations, different channel settings, and variations in the individual components and cable lengths.

Also, the baseband gain itself may vary across the frequency bands for each particular setting. Such variations may be represented by the different fixed gain values assumed for FIGS. 7, 8 and 9. As shown in FIGS. 7, 8 and 9, in each case, the BB-Gain is varied 725, 825 and 925, so as to produce a certain value of RX_IQ_MAG, e.g., 1000000.

The noise plots 705, 805, 905 are based upon the rms (root mean square) value of the noise, as described above with reference to equations (4) and (5). Assuming noise is Gaussian, noise has a mean of zero and a standard deviation, σ, equal to the rms. The noise values may vary in accordance with a Gaussian distribution and the setting of the BB_Gain should be such that noise peaks do not saturate the ADCs.

Figure 10:
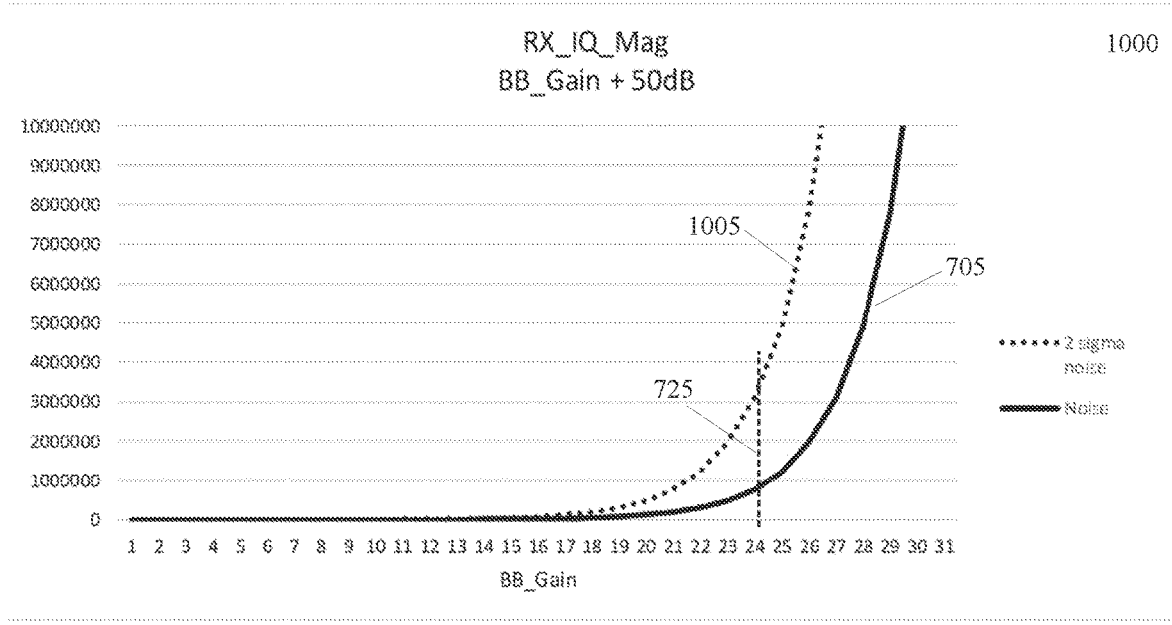
FIG. 10 is a graphical representation of the RX_IQ_MAG 437 for variation in BB_Gain setting from 0 to 31 with a 50 dB fixed gain.

FIG. 10 is a graphical representation 1000 of the RX_IQ_MAG 437 for variation in BB_Gain setting from 0 to 31 with a 50 dB fixed gain. Similar to FIG. 7, plot 705 is the rms noise. Plot 1005 is the noise 2 σ level. At a BB_Gain of 24, 725, the rms noise produces a RX_IQ_MAG value of about 1000000, but noise 2 σ peaks would produce a RX_IQ_MAG value of about 3000000. As the BB_Gain is increased, the slope of the noise curves becomes very steep and hence as low a value for the RX_IQ_MAG, that produces the required sensitivity, should be selected. In order to determine a reliable repeatable reading of the RX_IQ_MAG value, in one embodiment of this disclosure a process based upon determining the minimum median value of the averages is described below with reference to FIG. 15.

An example embodiment of a process is described to determine the baseband gain settings that comprises three steps: measurement, calibration, and setting. The measurement step determines the optimum value(s) of the RX_IQ_MAG. The calibration step may be carried out on each installation of the airborne measuring station 110, prior to operation, so as to determine the BB_Gain settings for each channel. The setting step takes place during an operation where the baseband gain is set according to the calibration.

In one embodiment of this disclosure, in the measurement step, the optimum RX_IQ_MAG value may be determined by inputting response packets 324 at the input of LNA 411, from a signal generator, in a laboratory environment, as discussed below with reference to FIG. 11. The BB_Gain setting may be varied and the level of the response packets reduced such that the best sensitivity may be found. The value of the RX_IQ_MAG may then be recorded. This value may be assumed to represent the optimum setting, "MAGopt". In the general sense, just two values for MAGopt may result: one for DSSS packets and one for OFDM packets.

As the wanted signal is well below the noise, e.g., −125 dBm wanted to −98 dBm noise, this measured value, MAGopt, may be assumed to be the RX_IQ_MAG value of the noise only. Thus, when the airborne measuring station 110 is installed in an aircraft, with a specific antenna 401 and specific RF circuitry 405 with associated RF cabling, a calibration procedure may be performed in order to determine the BB_Gain settings to produce an RX_IQ_MAG value equal or close to MAGopt for each channel, and the respective BB_Gain settings for each channel may be recorded. No signal generator is required for this calibration process, and the calibration procedure may be performed while the aircraft is on the ground, or in a hanger, prior to any flights. The calibration need only be carried out once for any specific installation. Ideally the antenna should not be receiving any signals other than noise. Simply pointing the antenna 401 towards the ground, assuming the antenna is maneuverable, whilst the aircraft is in the hanger, may suffice. An alternative, if the antenna is not maneuverable, is to effectively block external signals by placing a sheet of RF absorbent material in front of the antenna.

It may be assumed that "noise" may contain some spurious signals and may have high peaks due to the Gaussian nature of noise, as discussed above with reference to FIG. 10. Therefore, the calibration noise measurement of the RX_IQ_MAG may include a process to minimize the effect of spurious signals and noise peaks. As discussed above with reference to FIG. 4, the outputs of the squaring blocks 431 and 432 are summed 435 to produce a value that is proportional to $I^2+Q^2$. A running sum over a number of $I^2+Q^2$ samples may be calculated in summing block 436 and the sum magnitude results stored in a register 437 as "RX_IQ_MAG". An example of a process to select an RX_IQ_MAG value that has the least variance is discussed below with reference to FIG. 15.

For each unique installation of the airborne measuring station 110, the variations in gain may be significant, as discussed above with reference to FIGS. 7, 8, and 9, where variations of ±4 dB are assumed. The calibration procedure, which requires no test equipment, may be carried out on any installation prior to any flights. The required value(s) for MAGopt, however, remain constant for that particular airborne measuring station 110.

Figure 11:
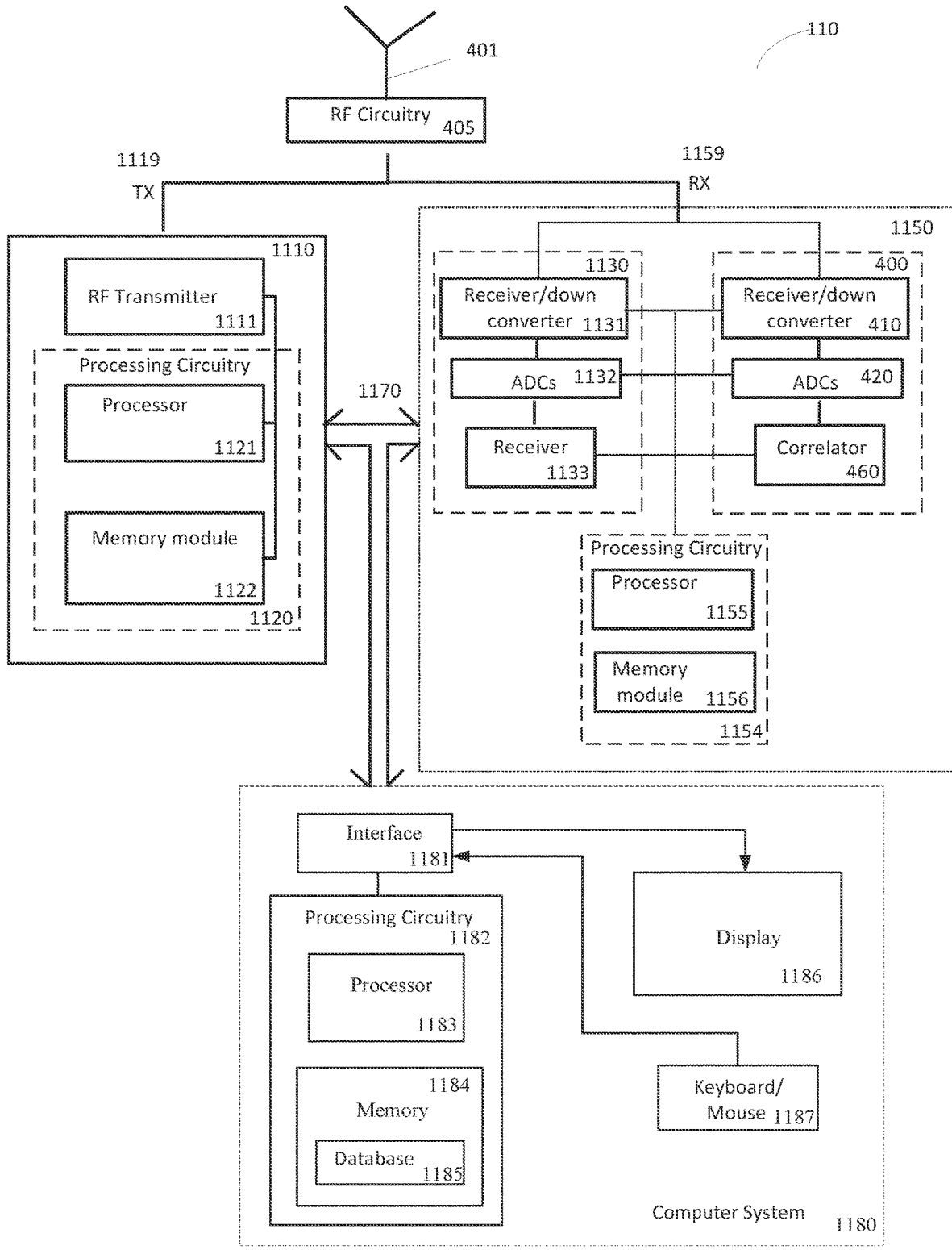
FIG. 11 illustrates a block diagram of an example airborne measuring station 110.

FIG. 11 illustrates a block diagram of an example airborne measuring station 110. The airborne measuring station 110 may be a device capable of wirelessly receiving signals and transmitting signals and may be configured to execute any of the methods of the Standard. Airborne measuring station 110 may be one or more stations or access points, and the like. The embodiment described herein is that where the airborne measuring station 110 includes one or more antennas 401, RF circuitry 405, wireless transmitter 1110 and a wireless receiver 1150. The airborne measuring station 110 may also include a computer system 1180 which is interconnected to the wireless transmitter 1110 and the wireless receiver 1150 by a data bus 1170.

In some embodiments, one or more antennas 401 are connected via RF circuitry 405 to the wireless transmitter 1110 and the wireless receiver 1150. The RF circuitry 405 may comprise different combinations of RF modules such as directional couplers, diplexers, splitter combiners, LNAs, RF switches, RF cable assemblies, and the like, as may be required for differing installations, in different airframes and that may include multiple antennas 401, and as may be required to accommodate multiple frequency bands, for example 2.4 and 5 GHz. The RF circuitry 405 is connected to the wireless transmitter 1110 and the wireless receiver 1150 via RF connectors 1119 and 1159 respectively.

In some embodiments, the wireless transmitter 1110 includes an RF transmitter 1111 and processing circuitry 1120 that includes processor 1121, and memory module 1122. The RF transmitter 1111 may perform the functions of DSSS and OFDM modulation, as described in the Standard, and amplification for the transmission of the DSSS and OFDM packets via the RF circuitry 405 and antenna 401. In some embodiments, the processing circuitry 1120 and/or the processor 1121 may comprise integrated circuitry for processing and/or control, e.g., one or more processors and/or processor cores and/or FPGAs (Field Programmable Gate Array) and/or ASICs (Application Specific Circuitry) configured to execute programmatic software instructions. In some embodiments, some functions of the RF transmitter 1111 may be performed by the processing circuitry 1120. The processing circuitry 1120 may be configured to control any of the methods and/or processes described herein and/or to cause such methods, and/or processes to be performed, e.g., by the RF transmitter 1111. The memory module 1122 may be configured to store data, programmatic software code and/or other information described herein. In some embodiments, the software may include instructions that, when executed by the processing circuitry 1120, causes the processing circuitry 1120 to perform the processes described herein with respect to the wireless transmitter 1110.

In some embodiments, the wireless receiver 1150 includes two wireless receivers 1130 and 400. Wireless receiver 1130 is a conventional Wi-Fi receiver whereas wireless receiver 400 includes a correlator that can detect Wi-Fi packets at negative SNRs as described above with reference to FIG. 4 and FIGS. 5 to 10.

Wireless receiver 1130 includes a receiver/down converter 1131, analog to digital converters, ADCs, 1132 and a receiver 1133. The receiver/down converter 1131 and ADCs 1132 are similar to the receiver/down converter 410 and ADCs 420 described above in FIG. 4. The baseband gain of the receiver/down converter 1131, however, is controlled by an automatic gain control AGC scheme as the signal strengths of the packets that receiver 1133 is intended to detect, have positive SNRs. The receiver/down converter 1131 may perform the usual functions of an RF receiver front end such as low noise amplification, filtering, and frequency down conversion so as to condition the received signal suitable for inputting to the receiver 1133 via the ADCs 1132. The receiver 1133 may perform the functions of demodulation of received packets as described in the Standard.

Wireless receiver 400 includes a receiver/down converter 410, analog to digital converters, ADCs, 420, and a correlator 460, as described above with reference to FIG. 4, The receiver/down converter 410 may perform the usual functions of an RF receiver front end such as low noise amplification, filtering, and frequency down conversion so as to condition the received signal suitable for inputting to the correlator 460 via the ADCs 420. The correlator 460 may perform the function of correlating conditioned, demodulated received bits with a known expected bit pattern.

The wireless receiver 1150 also includes processing circuitry 1154 that includes a processor 1155 and a memory module 1156. In some embodiments, the receiver/down converters 410 and 1131, and/or the correlator 460 and/or the receiver 1133 and/or the processing circuitry 1154 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments, the functions of the receivers 1133 and/or the correlator 460 may be performed by the processing circuitry 1154. The processing circuitry 1154 may be configured to control any of the methods and/or processes described herein and/or to cause such methods, and/or processes to be performed, e.g., by the wireless receiver 1150. The memory module 1156 is configured to store data, programmatic software code and/or other information described herein. In some embodiments, the software may include instructions that, when executed by the processing circuitry 1154, causes the processing circuitry 1154 to perform the processes described herein with respect to the wireless receiver 1150.

According to this embodiment of the disclosure, the wireless receiver 1130 may be configured to measure and monitor an input signal's attribute, such as may include one or more of a ranging signal transmitted by wireless transmitter 1110, data and control packets, and the response signal, including control packets, transmitted by an access point or station that may be based upon the Standard. Such packets may include data null, ACK, RTS and CTS packets. The memory module 1156 may store instructions for executing any method mentioned in the Standard, input signals, and results of processing of the processor 1155, signals to be outputted and the like.

According to an embodiment of the disclosure, the RF transmitter 1111 may be configured to transmit signals and the processing circuitry 1120 may be configured to prepare the transmitted signal attributes based upon the Standard. Such transmitted packets may include data packets, control packets and management packets that are to be transmitted by a wireless station that is based upon the Standard. Such data packets may include data null packets. Such control packets may include RTS packets. The memory module 1122 may store instructions for executing any method mentioned in the specification, input signals, and results of processing of the processor 1121, signals to be outputted and the like.

According to another embodiment of the disclosure, the wireless receivers 1130 and 400 of wireless receiver 1150 may be configured to receive the transmissions of another wireless communication device, e.g., a target station 120, and the processing circuitry 1154 may be configured to monitor an attribute of the transmissions of the other wireless communication device, and determine the value of the time of arrival of packets from the other wireless communication device. In addition, according to an embodiment of the disclosure, the wireless receiver 1130 may be configured to measure the times of departure of the transmissions from the wireless transmitter 1110.

According to an embodiment of the disclosure, a computer system 1180 may be used to control the operations of the airborne measuring station 110 and in particular the wireless transmitter 1110 and wireless receiver 1150. The computer system 1180 may include an interface 1181. Interface 1181 may contain a connection to the wireless transmitter 1110, the wireless receiver 1150, the connection to a display 1186, a connection to a keyboard and mouse 1187 as well as interfacing to the processing circuitry 1182. In some embodiments, the processing circuitry 1182 may include a processor 1183, a memory 1184, and a database 1185. The database 1185 may contain the ground mapping information of the area of interest and the processor 1183 and memory 1184 may be used to carry out processes for the geo-location of the target station 120, using the output of the correlator 460, and/or the receiver 1133 and the RTT calculations derived in the processing circuitry 1154 of the wireless receiver 1150, plus information on the position of the airborne measuring station 110 which may be inputted from external devices such as a GPS module, and information on the target station 120 which may be inputted using the keyboard and mouse 1187. The display 1186 may be used to show the ground map together with the indication of received response packets 324 from the target station 120 and, if available, the estimated location of the target station 120.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 1182 may include the memory 1184 and a processor 1183, the memory 1184 containing instructions which, when executed by the processor 1183, configure the processor 1183 to perform the one or more functions described herein.

In addition to a traditional processor and memory, the processing circuitry 1182 may comprise integrated circuitry for processing and/or control, e.g., one or more processors and/or processor cores and/or FPGAs (Field Programmable Gate Array) and/or ASICs (Application Specific Integrated Circuitry).

The processing circuitry 1182 may include and/or be connected to and/or be configured for accessing (e.g., writing to and/or reading from) the memory 1184, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1184 may be configured to store code executable by control circuitry and/or other data, e.g., data pertaining to communication, e.g., configuration and/or address data of nodes, etc. The processing circuitry 1182 may be configured to control any of the methods described herein and/or to cause such methods to be performed, e.g., by the processor 1183. Corresponding instructions may be stored in the memory 1184, which may be readable and/or readably connected to the processing circuitry 1182. In other words, the processing circuitry 1182 may include a controller, which may comprise a microprocessor and/or microcontroller and/or FPGA (Field-Programmable Gate Array) device and/or ASIC (Application Specific Integrated Circuit) device. It may be considered that the processing circuitry 1182 includes or may be connected or connectable to memory, which may be configured to be accessible for reading and/or writing by the controller and/or processing circuitry 1182. It is also noted that the elements of the airborne measuring station 110 can be included in a single physical device/housing or can be distributed among several different physical devices/housings.

Thus, some embodiments include a first wireless device (WD), comprising: a wireless transmitter 1111 configured to transmit a ranging signal and a wireless receiver 1150 configured to receive a response signal from a second WD in response to the ranging signal. The WD includes processing circuitry 1154 in communication with the wireless receiver 1150, the processing circuitry 1154 configured to, for each channel of the first WD: vary settings of a receive baseband gain of the wireless receiver 1150 and determine an IQ parameter value for each receive baseband gain setting; and record a receive baseband gain setting that produces a predetermined IQ parameter value for the channel, the predetermined IQ parameter value being predetermined based on a determined sensitivity of the wireless receiver 1150 resulting from each of a plurality of receive baseband gain settings.

In some embodiments, the determined IQ parameter value is a sum of squares of outputs of I and Q analog-to-digital converters (ADCs). In some embodiments, the predetermined IQ parameter value is determined as an IQ magnitude parameter value having a least variance. In some embodiments, the predetermined IQ parameter value is determined based at least in part on a response to a plurality of test packets in a preoperational setting. In some embodiments, the receive baseband gain settings are determined when an antenna of the WD is receiving only noise. In some embodiments, the determined IQ parameter is based at least in part on an average value of IQ parameter values determined over time.

Figure 12:
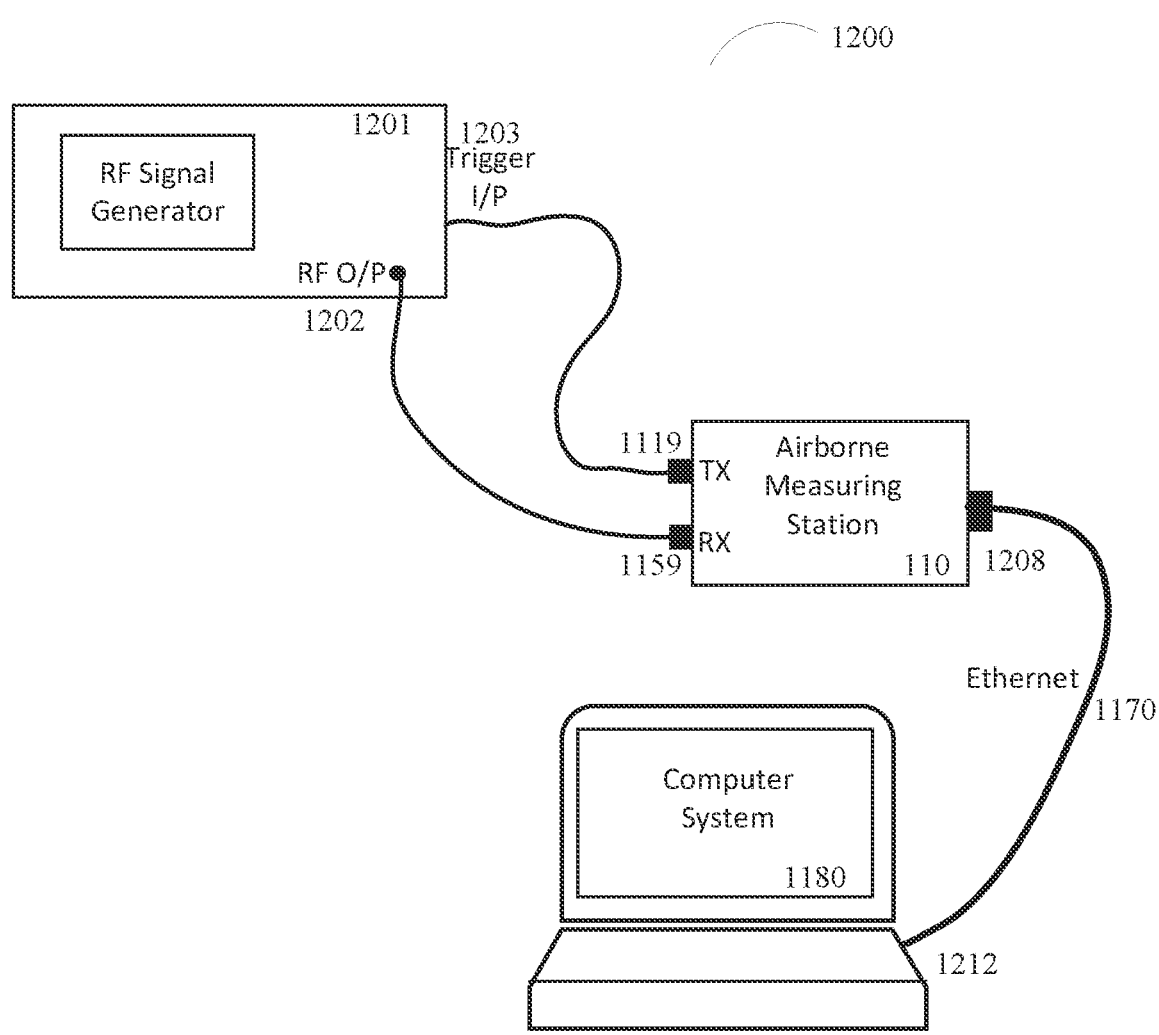
FIG. 12 is a schematic diagram of a laboratory setup, for determining the optimum RX_IQ_MAG value for a particular airborne measuring station.

FIG. 12 is a schematic diagram of a laboratory setup 1200, for determining the optimum RX_IQ_MAG value for a particular airborne measuring station 110 as may be used for the measurement step. As described above with reference to FIGS. 3 and 11, the airborne measuring station 110 transmits ranging packets 312 and receives response packets 324. In FIG. 12, in the laboratory setup 1200, the antenna 401 and RF circuitry 405 are not required. A transmit, TX, signal from the wireless transmitter 1110 in the airborne measuring station 110 at RF connector 1119 is connected to a trigger input connection 1203 on the RF signal generator 1201. The RF output 1202 from the signal generator 1201 is connected to the RX RF connector 1159 to the wireless receiver 1150 of the airborne measuring station 110. When the wireless transmitter 1110 transmits a ranging packet 312, the RF signal generator 1201 may be triggered to transmit a response packet 324 from the RF output 1202 to the wireless receiver 1150 of the airborne measuring station 110. An alternative for triggering the RF signal generator 1201 may be to use a digital signal from the processing circuitry 1120 of wireless transmitter 1110 that is derived from the internal command to transmit. The operation of an RF signal generator 1201 with respect to triggering is well known, as are the settings for an RF signal generator 1201 to transmit specific DSSS and OFDM Wi-Fi packets. A fixed delay between the trigger and the transmission of the response packet 324 may be set, and this effectively sets an expected RTT for wanted packets.

The wireless transmitter 1110 of airborne measuring station 110 may be caused to start the transmission of ranging packets 312 and the measurement of subsequent response packets 324 by a command from the computer system 1180 via a data bus 1170, which may be an Ethernet connection between a port 1212 on the computer system 1180 and port 1208 on the airborne measuring station 110. The RTTs of the response packets 324, as detected by the correlator 460 in the wireless receiver 1150, may also be sent to the computer system 1180. The setting of the BB_Gain in the receiver/down converter 410, in the wireless receiver 1150 of the airborne measuring station 110, may be controlled by the computer system 1180 via the Ethernet connection, data bus 1170. The value of the RX_IQ_MAG from the IQ magnitude block 430 in the wireless receiver 1150, may also be read by the computer system 1180 via the data bus 1170.

Hence, by systematically reducing the RF output power from the RF signal generator 1201 and by varying the BB_Gain of the receiver/down converter 410, the condition for maximum sensitivity of the wireless receiver 1150, may be found, for every channel. The maximum sensitivity may be determined from observation of the reported RTTs and the number that correspond to the RTT set by the delay in the triggering of the response packet in the RF signal generator 1201. For each channel, the RX_IQ_MAG value, MAGopt, may be recorded for this maximum sensitivity condition. This recording may be maintained in the memory 1184 in the computer system 1180, and/or the airborne measuring station 110. In the general sense, the value of MAGopt may be the same for all DSSS packets, and also a different but constant value may be measured for all OFDM packets. The settings of the BB_Gain, however, may be different for each channel. Hence, for all airborne measuring stations 110 of identical design, only a single MAGopt value for maximum sensitivity may be required to be recorded for DSSS packets in the 2.4 GHz band and similarly, only a single MAGopt value for OFDM packets in the 2.4 and 5 GHz band may be required to be recorded.

Figure 13:
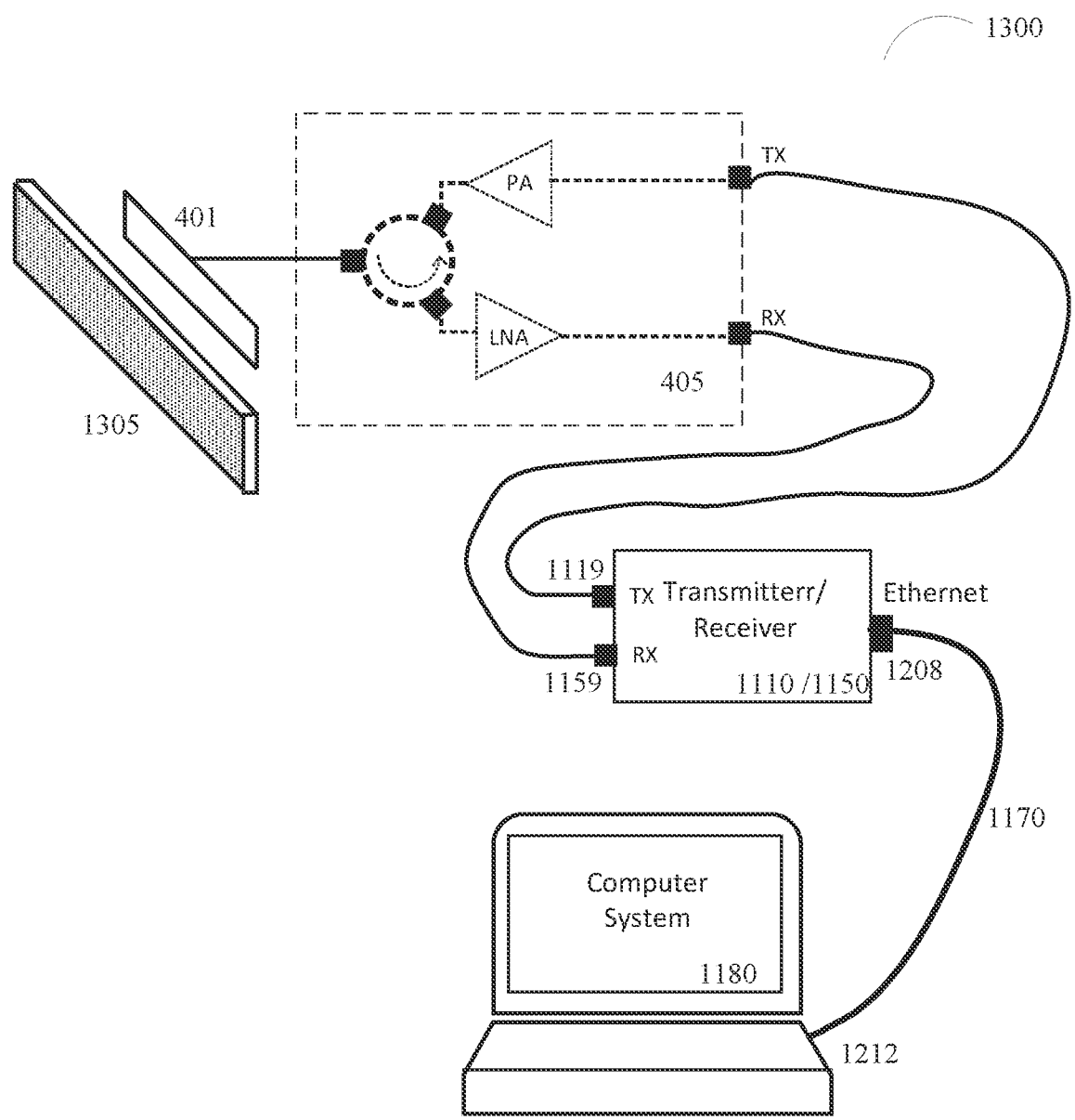
FIG. 13 is a schematic diagram of part of an example of an installation of an airborne measuring station in an aircraft.

FIG. 13 is a schematic diagram of part of an example of an installation 1300 of an airborne measuring station 110 in an aircraft for which the calibration step may be carried out. A full installation may include other devices such as a global positioning system (GPS) module, a gyro module and a network switch such as an Ethernet switch, which have been omitted from FIG. 13 as they do not play a part in this disclosure. Hence, FIG. 13 comprises only the airborne measuring station 110. The antenna 401 may comprise one or more antennas, and the RF circuitry 405 may comprise one or more power amplifier, LNA, direction couplers and/or splitter/combiners and/or RF switches. The RF Circuitry 405 is connected to the wireless transmitter 1110 via RF connector 1119 and to the wireless receiver 1150 via RX RF connector 1159. For each installation the details of the antenna(s) 401 and the RF circuitry 405 may differ, and hence the gain before the RX RF antenna connector 1159 may be different. In addition, this gain may vary across the frequency bands and channels. As described above with reference to FIGS. 5 to 10, the BB_Gain of the receiver/downconverter 410 may be varied, and the RX_IQ_MAG, from the IQ Magnitude block 430, read. In particular, the BB_Gain setting may be varied such that the RX_IQ_MAG value is equal to MAGopt, which is measured as discussed above with reference to FIG. 12. The BB_Gain setting for RX_IQ_MAG value to be equal or close to MAGopt may be recorded for every channel covered by the airborne measuring station 110.

Hence, the baseband gain may be calibrated for this particular installation, 1300. The list of BB_Gain settings, for each channel may be recorded and stored in the memory 1184 or memory module 1156 and recalled automatically as each channel is selected. As discussed above, for this calibration step, the effective signal at the antenna 401 should be predominantly noise, i.e., there are no RF signals present. This may be accomplished by several means. If, for example, the installation is in an aircraft that is inside a hanger, then the obstruction of the hanger may be sufficient to obstruct any outside signals. Pointing the antenna 401 towards the ground may also be sufficient. Another option is to use a sheet of RF absorbing material 1305 in front of the antenna 401 so as to block any RF signals that may be present.

Figure 14:
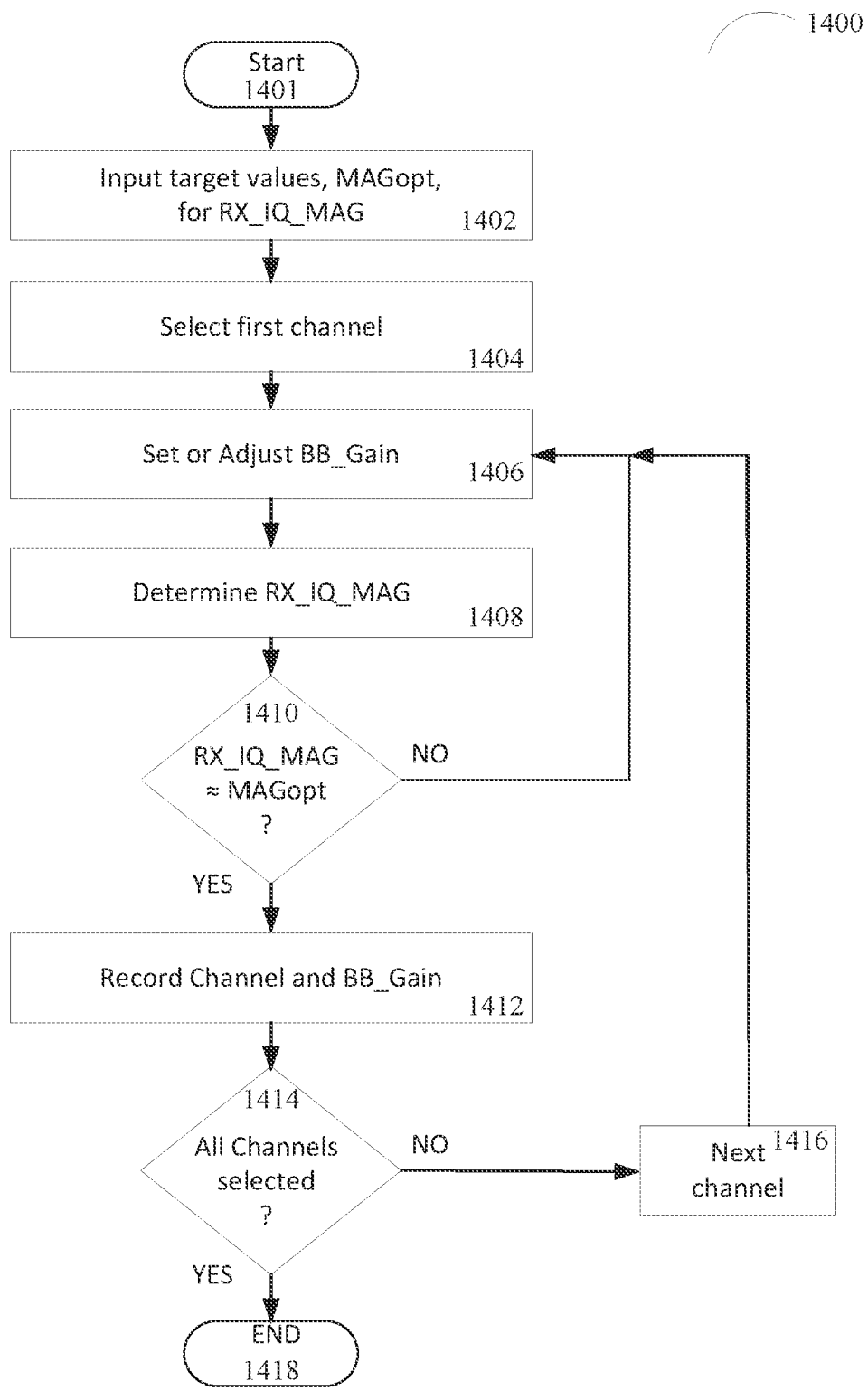
FIG. 14 is a flowchart of an example of a calibration process to set the BB_Gain for each channel for an installation, as discussed above with reference to FIG. 13, of an airborne measuring station.

FIG. 14 is a flowchart of an example of a calibration process 1400 to set the BB_Gain for each channel for an installation, as discussed above with reference to FIG. 13, of an airborne measuring station 110. Calibration process 1400 may start at step 1401. At step 1402 the target values, MAGopt, as determined by the measuring procedure discussed above with reference to FIGS. 12 and 13, may be inputted. More than one MAGopt value may be entered, corresponding to sets of channels, and/or type of packets, DSSS or OFDM. An initial channel that is supported by the airborne measuring station 110 is selected in step 1404. At step 1406 the BB_Gain of the receiver/down converter 410, is first set to an initial value, and the resulting RX_IQ_MAG value determined at step 1408. The RX_IQ_MAG value may be determined using a process of calculating the minimum median average value. The details of an example of this process at step 1408 is discussed below with reference to FIG. 15.

At step 1410 it is checked if the determined RX_IQ_MAG value is equal, or close to MAGopt. If not, then the process returns to step 1406 and the BB_Gain is adjusted. Steps 1406, 1408 and 1410 are repeated until at step 1410, the RX_IQ_MAG value is equal or close to MAGopt. Assuming that the BB_Gain setting is in 2 dB steps, the selected BB_Gain setting is such that the RX_IQ_MAG value is equal to or less than MAGopt, and, at one step higher the RX_IQ_MAG value is greater than MAGopt. The BB_Gain setting, for the selected channel, is recorded at step 1412. At step 1414, a check is made if there are more channels to be selected, and if so, then at step 1416, the next channel is selected and the process returns to step 1406. If all channels have been calibrated, then the process ends at step 1418.

Determining the BB_Gain setting in steps 1406 to 1410 may be accomplished using various methods. For example, an incremental step routine may be used, or, more efficiently a binary search may be used. Such methods are known. The process 1400 may be carried out in the processing circuitry 1154 or 1182 and the results displayed on the computer system 1180.

Figure 15:
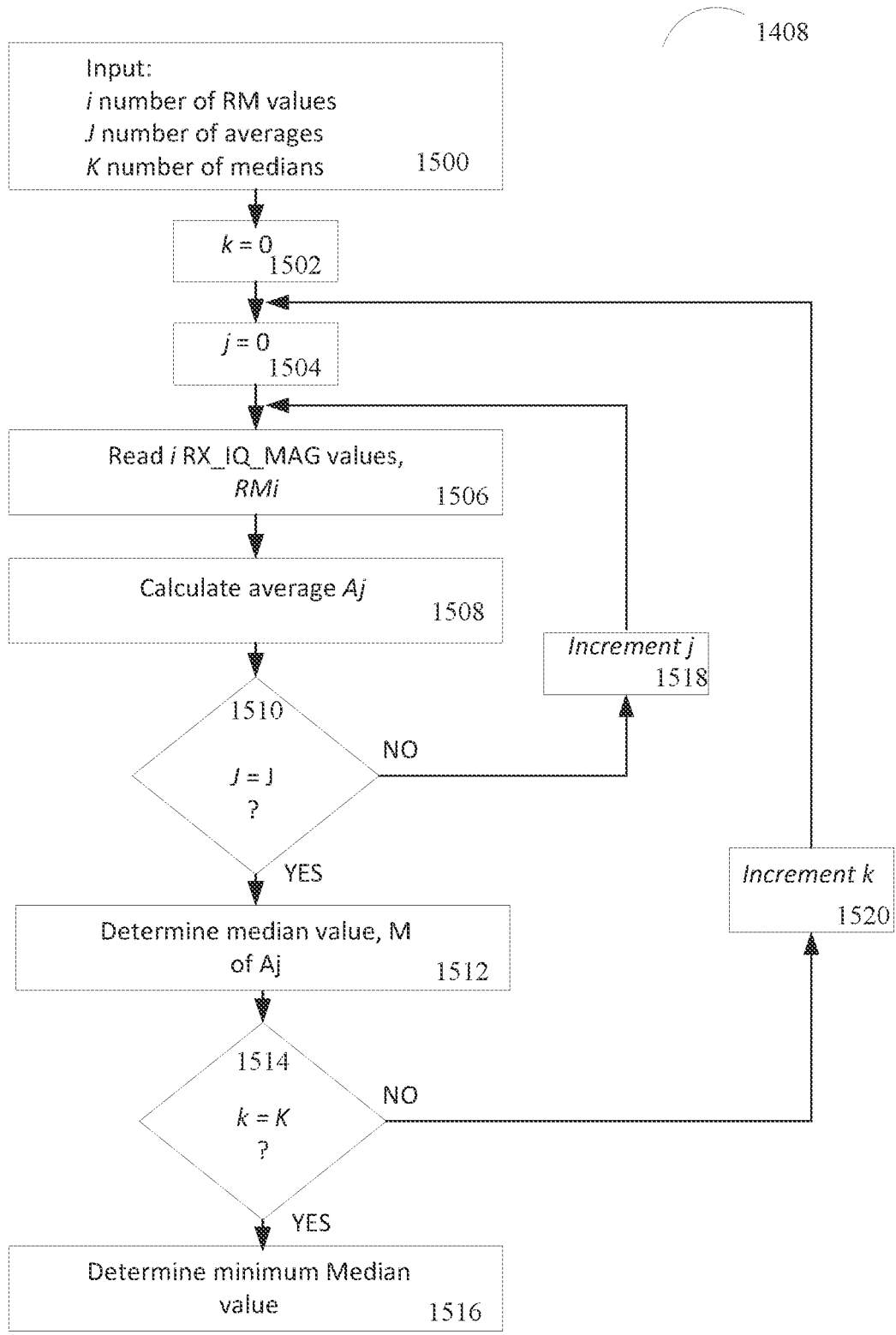
FIG. 15 is a flow chart of an example of a process to determine the RX_IQ_MAG value due to noise, that represents the value with the least variance.

FIG. 15 is a flow chart of an example of a process at step 1408 to determine the RX_IQ_MAG value, due to noise, that represents the value having the least variance. Values for variable parameters i, J, and K are inputted at step 1500. These values are preset and may be read from processing circuitry 1154 or 1182. The process for step 1408 starts by setting the values of parameters k and j to zero (steps 1502 and 1504 respectively). At step 1506, i values $RM_i$ of the RX_IQ_MAG, in the register 437, are read, $\{RM_0, RM_1, RM_2, \ldots RM_i\}$. At step 1508 the average, $A_j$, of the i values of the RX_IQ_MAG magnitudes, $\{RM_0, RM_1, RM_2, \ldots RM_i\}$, is calculated $A_j=\Sigma_0^i RM_i$. At step 1510 the value of j is checked and if j is not equal to J, then j is incremented at step 1518 and the process returns to step 1506. If, at step 1510, j is equal to J, then the process continues to step 1512. The input to step 1512 is therefore an array of J averages, $\{A_1, A_2, \ldots A_J\}$. In step 1512 the median value, $M_k$, of array $\{A_1, A_2, \ldots A_J\}$ is determined, $M_k$=median $\{A_1, A_2, \ldots A_J\}$. At step 1514, the value of k is checked and if k is not equal to K then k is incremented at step 1520, and the process returns to step 1504. If, at step 1514 k is equal to K, then the process continues to step 1516. Hence, the input to step 1516 is an array of K median values, $\{M_1, M_2, \ldots M_K\}$. In step 1516 the minimum median value, MIN $\{M_1, M_2, \ldots M_K\}$ is selected as the value for RX_IQ_MAG that is passed to step 1410 in FIG. 14. This value, the minimum median value, represents the value with the least variance. In order that this minimum median value represents the least variance is where example values for i, J and K are 255, 255, and 64 respectively may be used.

Figure 16:
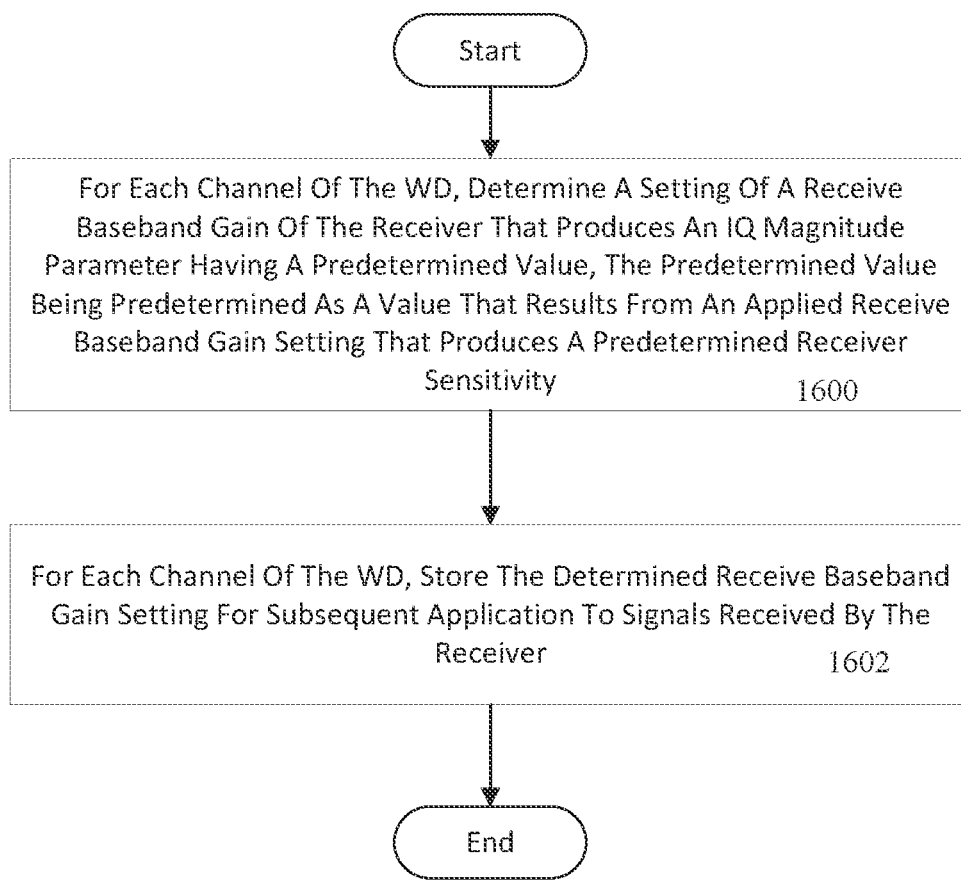
FIG. 16 is a flowchart of an example process in a WD for setting receiver baseband gain according to principles disclosed herein.

FIG. 16 is a flowchart of an example process in a WD for setting a receiver baseband gain for receiving wanted signals with negative signal to noise by a receiver of the WD. The process may be performed at least by the processing circuitry 1154, including the processor 1155 and memory module 1156. The process includes, for each channel of the WD, determining a setting of a receive baseband gain of the receiver that produces an IQ magnitude parameter having a predetermined value, the predetermined value being predetermined as a value that results from an applied receive baseband gain setting that produces a predetermined receiver sensitivity at step 1600. The process also includes, for each channel of the WD, storing the determined receive baseband gain setting for subsequent application to signals received by the receiver at step 1602.

In some embodiments, the IQ magnitude parameter is a sum of squares of outputs of I and Q analog-to-digital converters (ADCs). In some embodiments, the predetermined value is determined as an IQ magnitude parameter value having a least variance. In some embodiments, the least variance value of the IQ magnitude parameter is calculated by: reading an IQ magnitude value i times, and taking an average, A, of the readings; recording averages, $A_j$, for J sets of readings of the IQ magnitude, $\{A_1, A_2, A_3, \ldots A_J\}$; determining a median value, $M_k$, of the averages, MEDIAN$\{A_1, A_2, A_3, \ldots A_J\}$; recording the median values, $M_k$, for K sets of determinations of the median values, $\{M_1, M_2, M_3, \ldots M_K\}$; determining a minimum median value, MIN $\{M_1, M_2, M_3, \ldots M_K\}$; and returning the minimum median value as the IQ magnitude parameter value having the least variance. In some embodiments, the predetermined value is determined based at least in part on determining a response to a plurality of test packets in a preoperational setting. In some embodiments, the receive baseband gain settings are determined when an antenna of the WD is receiving only noise. In some embodiments, a determined receive baseband gain setting corresponds to direct sequence spread spectrum signal receiver sensitivity. In some embodiments, a second determined receive baseband gain setting corresponds to orthogonal frequency division multiple (OFDM) receiver sensitivity.

Figure 17:
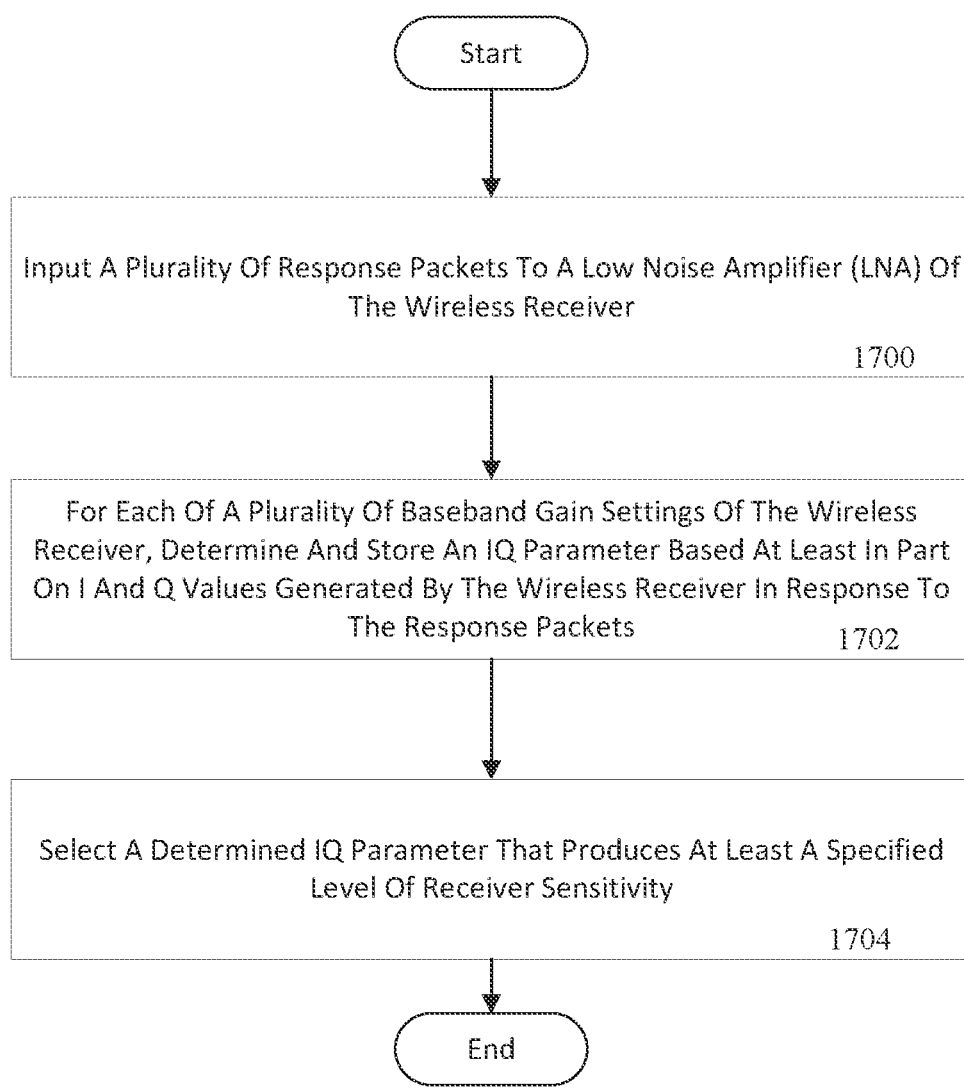
FIG. 17 is a flowchart of an example process for pre-calibrating a wireless receiver of a WD according to principles disclosed herein.

FIG. 17 is a flowchart of an example process for pre-calibrating a wireless receiver of a WD. The process may be performed at least by the processing circuitry 1120, 1154, including the processor 1121, 1155 and memory module 1122, 1156. The process includes inputting a plurality of response packets to a low noise amplifier (LNA) of the wireless receiver at step 1700. The process also includes, for each of a plurality of baseband gain settings of the wireless receiver, determining and storing an IQ parameter based at least in part on I and Q values generated by the wireless receiver in response to the response packets at step 1702. The process further includes selecting a determined IQ parameter that produces at least a specified level of receiver sensitivity at step 1704.

In some embodiments, selecting a determined IQ parameter includes selecting a lowest determined IQ parameter that produces the specified level of receiver sensitivity. In some embodiments, determining the IQ parameter includes determining a minimum median value of averages of IQ parameters. In some embodiments, the determined IQ parameters are based at least in part on a sum of squares of the I and Q values. In some embodiments, the response packets are received at a level below a level of noise of the wireless receiver. In some embodiments, selecting the determined IQ parameter includes selecting an IQ parameter having a least variance.

Some embodiments may include one or more of the following:

Embodiment 1. A method in a first wireless device (WD) for setting a receiver baseband gain for wanted signals with negative signal to noise, the method comprising:

deriving an IQ magnitude parameter;

determining an optimum IQ magnitude, MAGopt;

for an installation of the WD, performing a calibration routine as follows:

determining the settings of the WD receive baseband gain such that background noise produces the MAGopt value for the IQ magnitude parameter for each channel supported by the WD; and saving the baseband gain settings for each channel; and recalling the baseband settings saved for each channel, as a channel is selected.

Embodiment 2. The method of Embodiment 1, wherein the IQ magnitude parameter is the sum of the squares of the outputs of the I and Q ADCs, $I^2+Q^2$.

Embodiment 3. The method of Embodiment 1, wherein the value of the least variance IQ magnitude is derived.

Embodiment 4. The method of Embodiment 3 wherein the minimum variance value of the IQ magnitude is calculated by:

reading the IQ magnitude value i times, and taking the average, A;

recording the averages, $A_j$, for J sets of readings of the IQ magnitude, $\{A_1, A_2, A_3, \ldots A_J\}$;

determining the median value, $M_k$, of the averages, MEDIAN$\{A_1, A_2, A_3, \ldots A_J\}$;

recording the median values, $M_k$, for K sets of determinations of the median values, $\{M_1, M_2, M_3, \ldots M_K\}$;

determining the minimum median value, MIN $\{M_1, M_2, M_3, \ldots M_K\}$; and returning the minimum median value as the IQ magnitude.

Embodiment 5. The method of Embodiment 1 wherein the optimum IQ magnitude, MAGopt, is the value that corresponds to the maximum receive sensitivity.

Embodiment 6. A first wireless device (WD), comprising:

a wireless transmitter configured to transmit a ranging signal and a wireless receiver configured to receive a response signal from a second WD in response to the ranging signal;

the wireless receiver configured to:

derive an IQ magnitude parameter;

processing circuitry in communication with the receiver, the processing circuitry configured to:

record the optimum IQ magnitude, MAGopt;

for an installation of the WD, performing a calibration routine as follows:

vary the settings of the WD receive baseband gain and record the settings of the WD receive baseband gain such that background noise produces the MAGopt value for the IQ magnitude parameter for each channel supported by the WD;

save the baseband gain settings for each channel; and recall the baseband settings saved for each channel, as a channel is selected.

Embodiment 7. The method of Embodiment 6, wherein the IQ magnitude parameter is the sum of the squares of the outputs of the I and Q ADCs, $I^2+Q^2$.

Embodiment 8. The method of Embodiment 6, wherein the value of the least variance IQ magnitude is derived.

Embodiment 9. The method of Embodiment 8 wherein the processing circuitry is configured to calculate the minimum variance value of the IQ magnitude as follows:

read the IQ magnitude value i times, and take the average, A;

record the averages, $A_j$, for J sets of readings of the IQ magnitude, $\{A_1, A_2, A_3, \ldots A_J\}$;

determine the median value, $M_k$, of the averages, MEDIAN$\{A_1, A_2, A_3, \ldots A_J\}$;

record the median values, $M_k$, for K sets of determinations of the median values, $\{M_1, M_2, M_3, \ldots M_K\}$;

determine the minimum median value, MIN $\{M_1, M_2, M_3, \ldots M_K\}$; and return the minimum median value as the IQ magnitude.

Embodiment 10. The method of Embodiment 6 wherein the optimum IQ magnitude, MAGopt, is the value that corresponds to the maximum receive sensitivity.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible, including, for examples: the baseband gain settings, the IQ magnitude calculation, the determination of the MAGopt. Accordingly, the scope should be determined not by the embodiments illustrated.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD) for setting a receiver baseband gain for receiving wanted signals with negative signal to noise by a receiver of the WD, the method comprising:
   for each channel of the WD, determining a setting of a receive baseband gain of the receiver that produces an IQ magnitude parameter having a predetermined value, the predetermined value being predetermined as a value that results from an applied receive baseband gain setting that produces a predetermined receiver sensitivity; and
   for each channel of the WD, storing the determined receive baseband gain setting for subsequent application to signals received by the receiver.

2. The method of claim 1, wherein the IQ magnitude parameter is a sum of squares of outputs of I and Q analog-to-digital converters (ADCs).

3. The method of claim 1, wherein the predetermined value is determined as an IQ magnitude parameter value having a least variance.

4. The method of claim 3, wherein the least variance value of the IQ magnitude parameter is calculated by:
   reading an IQ magnitude value i times, and taking an average, A of the readings;
   recording averages, $A_j$, for J sets of readings of the IQ magnitude, $\{A_1, A_2, A_3, \ldots A_J\}$;
   determining a median value, $M_k$, of the averages, $MEDIAN\{A_1, A_2, A_3, \ldots A_J\}$;
   recording the median values, Mt, for K sets of determinations of the median values, $\{M_1, M_2, M_3, \ldots M_K\}$;
   determining a minimum median value, $MIN\{M_1, M_2, M_3, \ldots M_K\}$; and
   returning the minimum median value as the IQ magnitude parameter value having the least variance.

5. The method of claim 1, wherein the predetermined value is determined based at least in part on determining a response to a plurality of test packets in a preoperational setting.

6. The method of claim 1, wherein the receive baseband gain settings are determined when an antenna of the WD is receiving only noise.

7. The method of claim 1, wherein a determined receive baseband gain setting corresponds to direct sequence spread spectrum signal receiver sensitivity.

8. The method of claim 1, wherein a second determined receive baseband gain setting corresponds to orthogonal frequency division multiple (OFDM) receiver sensitivity.

9. A first wireless device (WD), comprising:
   a wireless transmitter configured to transmit a ranging signal and a wireless receiver configured to receive a response signal from a second WD in response to the ranging signal; and
   processing circuitry in communication with the wireless receiver and with the wireless transmitter, the processing circuitry configured to, for each channel of the first WD:
      vary settings of a receive baseband gain of the wireless receiver and determine an IQ parameter value for each receive baseband gain setting; and
      record a receive baseband gain setting that produces a predetermined IQ parameter value for the channel, the predetermined IQ parameter value being predetermined based on a determined sensitivity of the wireless receiver resulting from each of a plurality of receive baseband gain settings.

10. The WD of claim 9, wherein the determined IQ parameter value is a sum of squares of outputs of I and Q analog-to-digital converters (ADCs).

11. The WD of claim 9, wherein the predetermined IQ parameter value is determined as an IQ magnitude parameter value having a least variance.

12. The WD of claim 9, wherein the predetermined IQ parameter value is determined based at least in part on a response to a plurality of test packets in a preoperational setting.

13. The WD of claim 9, wherein the receive baseband gain settings are determined when an antenna of the WD is receiving only noise.

14. The WD of claim 9, wherein the determined IQ parameter is based at least in part on an average value of IQ parameter values determined over time.

* * * * *